Reissued Oct. 11, 1938

Re. 20,880

UNITED STATES PATENT OFFICE 20,880

ARYL MERCURY COMPOUNDS OF UREID AND PURINE BASES AND METHOD OF MAKING THE SAME

Carl N. Andersen, Wellesley Hills, Mass., assignor to Lever Brothers Company, a corporation of Maine No Drawing. Original No. 2,118,133, dated May 24, 1938, Serial No. 754,373, November 22, 1934, Application for reissue July 30, 1938, Serial No. 222,145

15 Claims. (Cl. 260—242)

The present invention relates to the production of certain new organic mercury compounds.

It is an object of my invention to produce new aryl mercury compounds of ureid and purine bases useful as germicides and for other therapeutic purposes.

More particularly, it is an object of my invention to prepare certain organic mercury compounds which may be regarded as derivatives of an imido compound, in which the imido group is a part of the characteristic group:

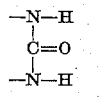

This group is contained in the ureids and purine bases.

I have discovered that when the hydrogen atom or atoms of this group are replaced by the essential radical of certain aromatic mercury compounds, compounds are produced which have extraordinarily high potency as antiseptics and germicides and at the same time are characterized by relatively low toxicity and other desirable properties.

The compounds constituting the subject matter of the present invention include those having the general formula

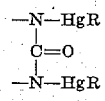

in which R represents an aromatic structure to a nuclear carbon atom of which the mercury is directly attached.

Compounds included in my invention may also have one of the imido hydrogen atoms replaced by a monovalent hydrocarbon radical such as:

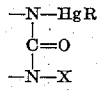

where X is any mono-valent radical.

Similarly, the oxygen may be replaced by sulphur to form the radical:

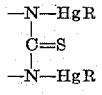

or

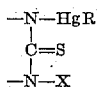

In the above description it is assumed that when the compound contains two imido hydrogens, both will be replaced. By employing suitable amounts of reagents and under proper conditions, only one may be replaced and I intend my invention to include compounds of this type, for example:

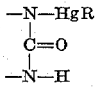

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

I have investigated many compounds containing the above described characteristic group and have discovered that they may be converted into aromatic mercury compounds of the type described. I have prepared a sufficiently large number to lead me to believe that all of the compounds containing this characteristic group can be converted into aromatic mercury derivatives of the type described, and I intend my invention to be generic to include this entire class. I have prepared aromatic mercury derivatives of the following members of this class and determined their physical properties. They are representative of the entire class and all are useful as antiseptics and germicides: barbituric acid, diethyl barbituric acid, parabanic acid, thiobarbituric acid, uric acid, di-chlorobarbituric acid, alloxan, theobromine, allantoin, xanthine, Benzo Fast Orange W S D (Schultz #305, 7th ed.), and Algol Yellow (Schultz #1250 Colour Index #1138).

The theobromine and xanthine are derivatives of the purine group. They are sometimes spoken of as aliphatic alkaloids, but more accurately as vegetable bases.

Many dyes, such as the last two compounds listed contain the above referred to characteristic group. I find these compounds to be very satisfactory antiseptics and intend my invention to include them.

It will be noted that the diethyl barbiturate, the thiobarbiturate and the di-chlorobarbiturate are substituted barbiturates. The substituted derivatives of barbituric acid are numerous and I intend my invention to include all of these barbiturate derivatives.

All of the compounds of the type described are species of imides, in that they contain two imido groups.

In my application Serial No. 754,372, filed November 22, 1934, I have disclosed the general method of preparing an aromatic mercury imido compound by reacting a compound containing an imido group with an aromatic mercury hydroxide. In my application Serial No. 694,200, filed October 18, 1933, I have disclosed the general method of preparing an aromatic mercury imido compound by reacting a compound containing an imido group with a soluble aromatic mercury salt, such as the acetate. In each method, the aromatic mercury radical of the hydroxide or the salt becomes attached to the nitrogen of the imido group. Either of these general methods may be employed in producing the compounds comprising the present invention.

The compounds may be prepared in various ways. The following specific examples are given as illustrative of the methods which may be employed in producing my compounds, as well as to illustrate representative organic mercury derivatives of imido compounds falling within the scope of my invention:

*Example 1*

5.88 grams of phenylmercury hydroxide is dissolved in 2 liters of water by heating to boiling. The solution is then filtered to remove any gums or other insoluble materials present. To the filtrate is added 3.2 grams of barbituric acid dissolved in 100 cc. of water. A precipitate forms immediately. The mixture is allowed to stand for 12 hours, and filtered. The precipitate is washed thoroughly with warm water and dried in an oven at 110° C. The resulting product is a white crystalline powder which is sparingly soluble in water. The melting point is in excess of 270° C. The compound is phenylmercury barbiturate.

*Example 2*

17.64 grams of phenylmercury hydroxide is dissolved in 4 liters of water. The solution is then filtered and to the filtrate is added an aqueous solution of 3.76 grams of parabanic acid. The mixture is brought to boiling and then allowed to cool and stand for 24 hours. The white precipitate which forms is then filtered, washed well with warm water and dried. This product is sparingly soluble in water and melts in excess of 287° C. The compound is phenylmercury parabanate.

*Example 3*

17.64 grams of phenylmercury hydroxide is dissolved in 4 liters of water and heated until solution is complete. The solution is then filtered to remove any gum or undissolved material. To the filtrate is added 4.75 grams of thiobarbituric acid in 400 cc. of water. A precipitate results and the mass is allowed to stand until cool, when it is filtered, washed with warm water and dried. The precipitate does not melt at 250° C. The compound is phenylmercury thiobarbiturate.

*Example 4*

3.3 grams of phenylmercury acetate is dissolved in 200 cc. of water and heated until solution is complete. The solution is then filtered to remove any insoluble material. To the filtrate is added the .5 gram of xanthine dissolved in alcohol. The solution is concentrated to ⅔ of its volume and allowed to stand for 18 hours. A precipitate results and the solution is filtered. The precipitate is washed well with warm water and a few cc. of alcohol, and dried. It decomposes at 360° C. The compound is phenylmercury xanthine.

*Example 5*

17.64 grams of phenylmercury hydroxide is dissolved in 2 liters of water and heated until solution is complete. The solution is filtered to remove any insoluble material. To the filtrate is added 3.16 grams of allantoin dissolved in 50 cc. of alcohol. A precipitate results and after the mixture has been allowed to stand for some time it is filtered. The precipitate is washed well with warm water and a few cc. of alcohol and dried. It decomposes at 210° C. The compound is phenylmercury allantoin.

*Example 6*

3.36 grams of phenylmercury acetate is dissolved in 200 cc. of water and heated until solution is complete. The solution is filtered to remove any insoluble material. To the filtrate is added 1.98 grams of theobromine dissolved in 200 cc. of water. A starch-like jelly results on standing. Upon concentrating the mixture a precipitate separates which is removed by filtration, washed and dried. It melts at 248–250° C. and is phenylmercury theobromine.

From the description of the specific examples it will be readily apparent to one skilled in the art how other compounds containing the characteristic group may be reacted with an aromatic mercury compound to produce aromatic mercury imides of analogous structure.

The reacting materials are employed in theoretical quantities. In some cases, particularly where the imido compound is water-soluble, I may employ approximately 10% excess of the imido compound in order to insure complete conversion of the aromatic mercury compound.

The operativeness of the process is not found to depend in any degree upon the temperature in which the reaction is effected. It is convenient to use heat because it facilitates the solution of the reacting components and speeds the reaction but the process can be carried out at any temperature, for example, room temperature. Similarly, the process may be carried out in any mutual solvent. Water is usually employed for reasons of convenience if the reacting components are water soluble, but if not, other solvents such as the alcohols or acetone or mixtures of these with each other or alone, may be used.

All of the compounds produced as above described are characterized by extraordinarily high potency as germicides. Tests to determine their efficacy in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec.

1931, described as F. D. A. Method Against *Eberthella typhi* (typhoid bacillus) at 37° C. and F. D. A. Special Method Against *Staph. aureus* at 37° C.

As illustrative of the potency of the compounds, the killing power of the following compounds is given merely as illustrative:

The figures represent the maximum dilutions at which killing in 15 minutes resulted:

| | *B. typhosus* | *Staph. aureus* |
|---|---|---|
| Phenylmercury barbiturate | 1:80,000 | 1:30,000 |
| Phenylmercury parabanate | 1:70,000 | 1:35,000 |
| Phenylmercury thiobarbiturate (in alcohol) | 1:70,000 | 1:30,000 |

These compounds are further characterized by particularly desirable properties from the standpoint of relative freedom from toxicity and their adaptability for various germicidal and therapeutic uses. Tests made with some of them, for example, the barbiturate, indicate that they are not only especially well suited for use as a germicide, but also that they have many other uses in medicine, for example, they may be used as a hypnotic or as a sedative and may be administered internally, intravenously or peritoneally with excellent results.

All of these compounds retain a high germicidal value when incorporated in soaps or mixed in various menstruums in forming antiseptic and germicidal compositions.

These new compounds may be used directly as germicides in aqueous or other solutions or may be formed into various preparations such as mouth washes, tooth pastes, soaps, ointments, etc.

This application is a continuation in part of my earlier filed application, Serial Number 694,203, filed October 18, 1933.

I claim:

1. A new organic mercury compound of the general formula $(RHg)_2.R_1$ in which R represents an aromatic structure in which none of the carbon atoms has direct linkage with any element other than hydrogen, carbon and mercury; and in which $R_1$ represents the radical of a compound selected from the group consisting of ureids and purine bases, the RHg groups being linked to said radical by the replacement of imido hydrogen.

2. A new organic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $x$ represents the number of RHg groups in the compound and is an integer having a value of at least one and not more than two; and in which $R_1$ represents the radical of a compound selected from the group consisting of ureids and purine bases, the RHg group being linked to said radical by the replacement of imido hydrogen.

3. A new organic mercury compound of the general formula $RHg.R_1$, in which R represents an aromatic structure to a carbon atom of which the mercury is directly attached and in which none of the carbon atoms has direct linkage with any element other than hydrogen, carbon and mercury; and in which $R_1$ represents the radical of a compound selected from the group consisting of ureids and purine bases, one of the imido hydrogens thereof being replaced by the RHg group.

4. A new organic mercury compound of the general formula $RHg.R_1$ in which R represents an aromatic structure to a carbon atom of which the mercury is directly attached and in which none of the carbon atoms has direct linkage with any element other than hydrogen, carbon and mercury; and in which $R_1$ represents the radical of a compound selected from the group consisting of ureids and purine bases, one of the imido hydrogens thereof being replaced by a monovalent lower alkyl radical and the other imido hydrogen thereof being replaced by the RHg group.

5. A compound of the general formula $(RHg)_x.R_1$, in which R represents an aromatic structure in which none of the carbon atoms have direct linkage with any element other than hydrogen, carbon and mercury; in which $x$ represents the number of RHg groups in the compound and is an integer having a value of at least 1 and not more than 2, and in which $R_1$ represents a barbituric acid radical.

6. A new organic mercury compound of the general formula $(C_6H_5Hg)_x.R_1$, in which $x$ represents the number of $C_6H_5Hg$ groups in the compound and is an integer having a value of at least one and not more than two, and in which $R_1$ represents the radical of a compound selected from the group consisting of ureids and purine bases, the $C_6H_5Hg$ group being linked to said radical by the replacement of imido hydrogen.

7. A compound of the general formula $(C_6H_5Hg)_x.R_1$ in which $x$ represents the number of $C_6H_5Hg$ groups in the compound and is an integer having a value of at least 1 and not more than 2 and in which $R_1$ represents the radical of barbituric acid.

8. A phenylmercury xanthine.

9. A new organic mercury compound of the general formula $C_6H_5Hg.R_1$, in which $R_1$ represents the radical of a compound selected from the group consisting of ureids and purine bases, one of the imido hydrogens thereof being replaced by the $C_6H_5Hg$ group.

10. Phenylmercury theobromine.

11. The method of preparing phenylmercury barbiturate which comprises reacting, in solution, barbituric acid with the compound $C_6H_5HgOH$.

12. The method of preparing organic mercury compounds which comprises reacting, in solution, a compound selected from the group consisting of ureids and purine bases with an aromatic mercury hydroxide in which the mercury is directly connected to a carbon atom of an aromatic structure in which none of the carbon atoms has direct linkage with any element other than hydrogen, carbon and mercury, whereby the aromatic mercury radical replaces hydrogen in the

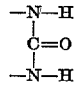

group.

13. The method of preparing organic mercury compounds which comprises reacting, in solution, a barbituric acid with an aromatic mercury hydroxide in which the mercury is directly connected to a carbon atom of an aromatic structure in which none of the carbon atoms has direct linkage with any element other than hydrogen, carbon and mercury, whereby the aromatic mercury radical becomes attached to nitrogen in the barbituric acid.

14. The method of preparing phenylmercury compounds which comprises reacting, in solution, a compound selected from the group consisting of ureids and purine bases with the compound $C_6H_5HgOH$.

15. A new organic mercury compound of the general formula $(C_6H_5Hg)_2.R_1$, in which $R_1$ represents the radical of a compound selected from the group consisting of ureids and purine bases, the $C_6H_5Hg$ groups being linked to said radical by the replacement of imido hydrogens.

CARL N. ANDERSEN.